US006679467B1

(12) United States Patent
Softness

(10) Patent No.: US 6,679,467 B1
(45) Date of Patent: Jan. 20, 2004

(54) CYLINDER MOUNT WITH THREE DEGREES OF FREEDOM

(76) Inventor: Donald G. Softness, 28 Trues Dr., West Islip, NY (US) 11795

( * ) Notice: Subject to any disclaimer, the term of this patent is extended or adjusted under 35 U.S.C. 154(b) by 0 days.

(21) Appl. No.: 10/359,509

(22) Filed: Feb. 5, 2003

(51) Int. Cl.$^7$ ................................................ E04G 3/08
(52) U.S. Cl. .................... 248/278.1; 248/479; 248/489; 359/871; 396/419
(58) Field of Search ............................ 248/278.1, 487, 248/279.1, 281.11, 274.1, 479, 485; 359/871, 872, 881; 396/419, 428

(56) References Cited

U.S. PATENT DOCUMENTS 4,991,815 A     2/1991  Softness
5,367,398 A  *  11/1994 Ito et al. ...................... 398/129
5,611,513 A  *   3/1997 Rosen ..................... 248/222.11
6,394,403 B1 *   5/2002 Hung ....................... 248/276.1

* cited by examiner

Primary Examiner—Ramon O Ramirez
(74) Attorney, Agent, or Firm—Milde & Hoffberg, LLP

(57) ABSTRACT

An assembly for mounting and adjusting an instrument, the received or transmitted radiation of which must accurately hit its receptor or target, is provided. The assembly includes a base which is mounted to a wall or beam, a pedestal connected to the base and an instrument or instrument mount connected to the pedestal. The instrument may rotate with respect to the pedestal about a first axis defined by the longitudinal axis of the pedestal and about a second axis perpendicular to the first axis, and about a third axis perpendicular to the second axis. This enables the position of the instrument to be easily adjusted in order to enable the assembly to be used at various locations, and for different uses.

20 Claims, 3 Drawing Sheets

CYLINDER MOUNT WITH THREE DEGREES OF FREEDOM

FIELD OF THE INVENTION

This invention relates to an assembly for properly aligning, along three axes, the mount of an instrument, the emitted or transmitted radiation of which must accurately hit its receptor or target area; such as a security mirror for seeing around a corner; or a video camera for surveillance at a sensitive, crime-ridden or vandal-prone area; said assembly being easy to align by those with access, and providing a tamper-proof configuration or directional setting, once oriented.

BACKGROUND OF THE INVENTION

Mirrors, video cameras, and other instruments for detecting and/or emitting electromagnetic radiation, such as microwave antennas, infrared transmitters (detectors), satellite receptor dishes, lasers and visible light are finding increased use in security systems and communication systems.

Beginning some two decades ago, and to the present day, security mirrors have had wide application in metropolitan subways and other personally hazardous public areas. They enable passengers to see around corners, angled stairwells, and blind alleys, to detect a malefactor who may be lurking. They also give passengers a heightened sense of security.

They also enable token booth attendants to see over crowds and around corners and spot a passenger being attacked or robbed. A third use is to enable conductors on trains at stations with curved-platforms or crowded platforms to see each door and insure that the closing doors to not catch the clothing or pocketbooks of passengers (and drag them to their deaths).

Each security mirror, regardless of its specific mission, must afford the observer surveillance of the intended target area. Therefore each mirror must be individually mounted and adjusted to that the sight lines of the observer cover the target area. Once the mirror is oriented or "aimed" it is essential that it cannot be moved out of alignment by physical force, such as by vandals who often frequent subway stations and other transportation hubs.

The bracket for the security mirror, or for the mount protecting the CCTV camera or other instrument presents a paradox. Initially, it must facilely and readily adjust on two axes so it is easily aimable by installation personnel. Once in place, it must be rock solid so that it remains in the desired orientation, despite possible attempts to unalign or steal it. Finally, it must be easily replaceable or re-aimable by maintenance personnel if target areas change.

U.S. Pat. No. 4,991,815 solved this paradox. It discloses a mirror assembly in which the mirror or instrument mount is supported on a beam, wall or ceiling, and may be rotatably adjusted in position about both a first axis, and a second axis perpendicular to the first axis. Once oriented, the configuration is locked in place and secure.

However, while a mirror having just two axes of rotation is tolerably functional, an instrument mount, particularly a video camera, to be optimally functional, needs a third axis of rotation. This also helps the functionality of a mirror.

The new invention consists of a barrel housing for the camera which is fully rotatable. This is vital for the following reasons:

1) If the mounting surface, such as a wall, is not plumb but is angled, or irregular, it enables the camera to be level.

2) The camera's orientation can be easily adjusted 45°, so that it can furnish vertical shots.

3) If the housing is mounted on a ceiling, the camera orientation can be easily adjusted 90° so the camera is right side up, instead of upside-down.

Secure, adjustable assemblies for focusing electromagnetic radiation have many other uses, and protect instruments other than mirrors. Microwave, infrared, laser or visible light beams, microwave antennas, infrared transmitters (detectors), satellite uplink dishes, satellite receptor dishes, lasers, photoelectric cells, radar, antenna arrays and searchlights are some other uses.

CCTV cameras can be found at a myriad of strategic locations deemed targets for terrorist attacks or criminal activity, including: government buildings; electric generating plants; drinking water reservoirs; dams, waterways; loading docks; military installations; post offices, museums; stadiums; bridges, tunnels, transportation hubs, trophy buildings; theaters; cultural centers, and thousands and thousands of city streets.

Some uses require protecting the instruments from extreme weather conditions, such as driving rain, high winds, floods, etc.

Accordingly, it is desirable to provide an assembly for a video camera or other instrument, which can be appropriately adjusted in position, and remain in the appropriate position, despite any unauthorized attempt to disturb the orientation or steal the instrument. It must be understood that, in most cases, if a mirror or instrument is moved from its orientation by only two or three degrees by an unauthorized person, it renders its surveillance function useless.

In most instances re-alignment of the instrument to the proper orientation is not easily achieved: there are expensive logistical problems involving the scheduling of maintenance crews, including: pulling workers off other jobs, which may involve travel time; and delays on subways, for example, when work closer than six feet to the track requires a flag man to halt trains, which inconveniences countless passengers on the immediate train and following trains, etc.

SUMMARY OF THE INVENTION

The present invention provides a fully adjustable, tamper-proof assembly for the mount of an instrument, the emitted radiation of which must accurately hit its receptor or target area. The assembly can be easily mounted on a wall, beam, or other secure support. In one embodiment, the instrument may be a video camera. With the assembly of the present invention, it is not required that the wall or support be perpendicular to the ground, as the three axes of rotation of the inventive assembly provide universal positioning ability.

The assembly includes a base which may be mounted to the e.g., wall or beam, and a cylindrical pedestal securely attached to the base. A cap with annular sleeve is rotatably attached to the pedestal, such as by means of tamper resistant set screws through the sleeve of the cap, which extend into an annular groove in the pedestal. The set screws may be tightened to abut against the circumferential surface of the groove, to fix the position of the cap with respect to the pedestal, establishing a first angle of sighting.

A pair of supports, each with one flat side, are attached to cap with their flat sides parallel to one another, defining a gap, therebetween. In a preferred embodiment, the supports are semi-circular in cross-section, having a cylindrical side and a flat side. The semicircular supports are provided with aligned holes, suitable for receiving an appropriately dimensioned pivot screw. The adjustable instrument housing, and its support, are rotatably fastened in the gap, on the pivot screw, as will be described below.

The video camera is placed in a cylindrical barrel housing, of heavy-gauge stainless steel, which is rotatably mounted within an annular mounting sleeve. The mounting sleeve has a pair of parallel extensions, dimensioned to be received in the gap of the semi-circular supports. The extensions are provided with passageways, which align with the holes in the semi-circular supports, for rotatably mounting the extensions, and thus the annular sleeve and cylindrical housing, about the pivot screw. The semi-circular supports are also provided with at least one set of tightening holes, aligned, and substantially perpendicular to the axis of the supports, for receiving a set of fastening tamper-proof set screws. The fastening screws extend through the tightening holes, and may be tightened against the flat surface of the extensions, to fix the position of the extensions with respect to the semi-circular supports, establishing a second angle of sighting.

The annular sleeve for mounting the cylindrical instrument housing is provided with means for fixing the rotation of the cylinder with respect thereto, thereby establishing the third angle of sighting. In one embodiment, the sleeve and extensions are formed such that aligning the extensions in the gap provides sufficient grasp of the cylinder to fix the rotation of the cylinder within the sleeve. In one preferred embodiment, the means is provided to align the sleeve extensions for placement in the mounting head. This is accomplished by use of two screws which go through the sleeve extensions, via a hole on one plate into a threaded hole on the second plate of the extensions. This aligns and forces the extensions together, thereby facilitating annular sleeve installation. Once aligned, the pivot screw and four set screws serve to tighten the sleeve against the surface of the cylinder. Thereafter, the two aligning screws may be removed if desired.

The final position of the instrument, such as a video camera, is the result of adjustment along three axes. The first axis is defined by the longitudinal axis of the pedestal. The second axis perpendicular to the first axis, and the third axis perpendicular to the second. Provision of the three axes, permits universal orientation of the instrument. For instruments having a rectangular viewer, such as a video camera, the assembly can be easily adjusted to provide a vertical or horizontal view, as needed. Provision of three axes always allows orientation of one side of a rectangular picture parallel to the ground, even if the base is mounted to a surface, such as an arch, which is not parallel, or perpendicular, to the ground.

It is an object of the invention to provide an improved instrument mount assembly which is easily adjustable, tamper-resistant, and can rotate about a first axis, and about a second axis perpendicular to the first axis, and a third axis perpendicular to the second axis.

Yet a further object of the invention is to provide an instrument assembly mount suitable for use in subway and train stations, loading docks, and unmanned entrances to buildings.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
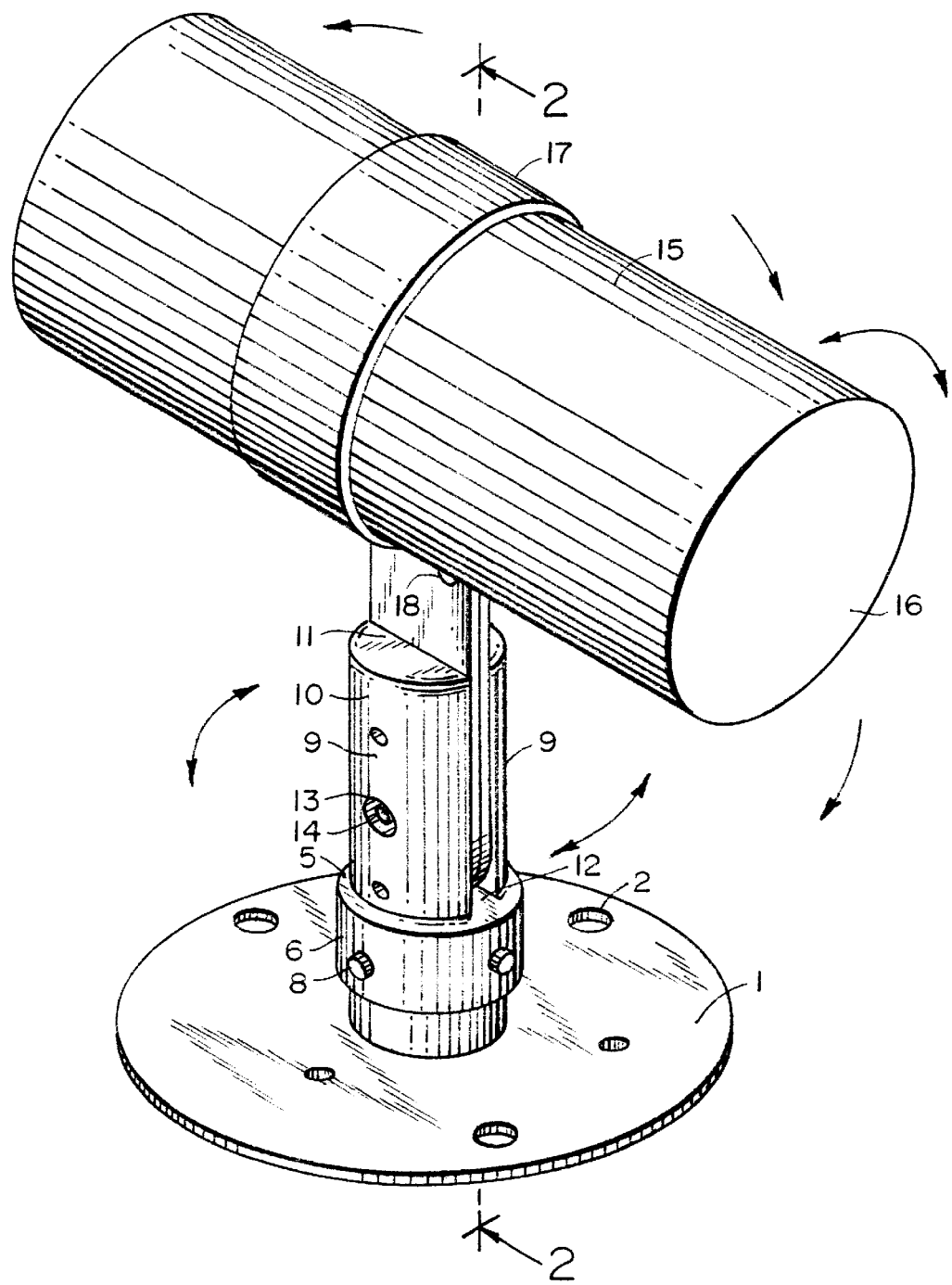
FIG. 1 is a perspective view of the preferred embodiment of the instrument assembly of the invention.

The preferred embodiments of the present invention will now be described with reference to FIGS. 1–5 of the drawings. Identical elements in the various figures are designated with the same reference numerals.

FIG. 1 illustrates an instrument assembly made in accordance with the invention, which includes a base or plate 1, a cylindrical pedestal 3 supported on base 1 and an instrument 16 in cylindrical housing 15, rotatably mounted in annular sleeve 17, pivotally connected to pedestal 3, as described below. Base 1 is provided with means, such as openings 2 for screws to mount the base to a wall or beam in a conventional manner. Once mounted, the assembly can be easily adjusted by rotation about three axes, as shown, so that the instrument can be pointed in any direction.

Figure 2:
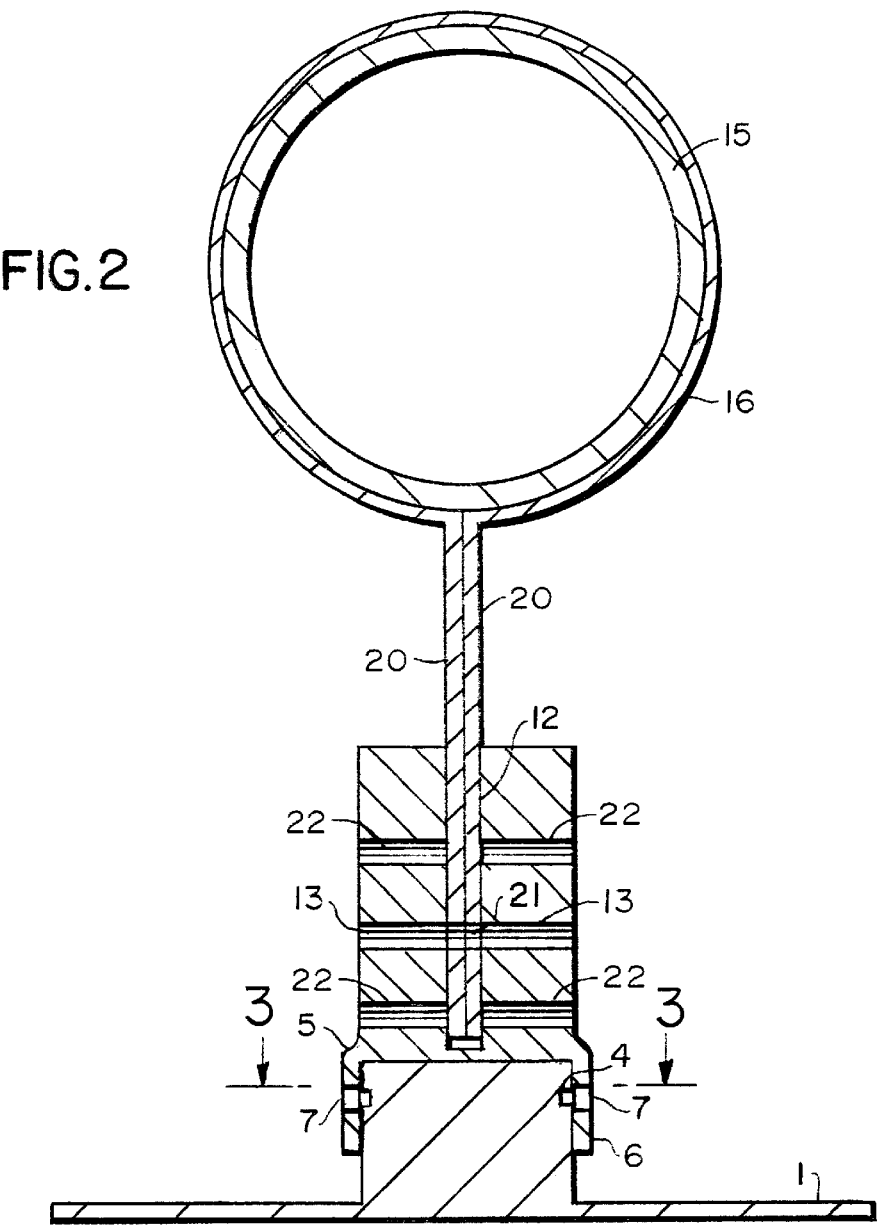
FIG. 2 is a cross-sectional view of the instrument of FIG. 1.

Turning now to FIG. 2, the mechanism for enabling rotation of instrument assembly 15 in a first axial direction with respect to pedestal 3 is provided. As is shown in FIG. 2, cap 5 of pedestal 3 includes an annular extending sleeve 6 formed with at least a pair of holes 7. If desired, sleeve 6 may include a corresponding number of welded nuts disposed about respective holes 7. Holes 7 formed in sleeve 6 are situated directly over an annular groove 4 formed within pedestal 3.

During assembly, after cap 5 is mounted on pedestal 3, set screws 8 are inserted within holes 7, as shown in FIG. 1. Cap 5 may then be rotated or turned about pedestal 3 in order to rotate the assembly about the longitudinal axis of pedestal 3.

Figure 3:
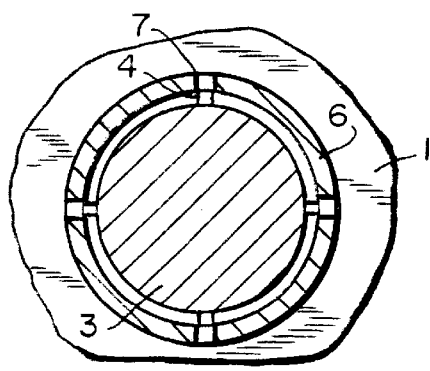
FIG. 3 is a cross-sectional view taken along line 3—3 of FIG. 2.

Turning now to FIG. 3, once an appropriate position is achieved for instrument 15, set screws 8 are tightened within holes 7 so that they abut against the circumferential surface of annular groove 4. As a result, instrument 15 is securely fixed in position with respect to pedestal 3 in a first axial direction.

Returning to FIGS. 1 and 2, the mechanism for enabling the instrument in cylindrical housing 15 to rotate with respect to pedestal 3 is now described. Cap member 5 has welded thereto and extending therefrom a pair of supports 9, with semi-circular cross-section. Also as shown, the supports are perpendicular to its external planar surface of the cap. If desired, the supports may extend at an angle to the external planar surface of the cap. In addition, different cross-sections may be used, as long as the supports provide sufficient strength for the instrument. Each semi-circular support has a cylindrical surface and a flat surface. The supports 9 are oriented with their flat surfaces parallel, defining a gap 12 therebetween. Each of the supports 9 includes respective aligned holes 13 extending therethrough, suitable for receiving an appropriately dimensioned pivot screw 14, as described below.

Continuing with FIG. 2, the instrument in cylindrical housing, 15 is rotatably mounted in an annular sleeve 17, which is provided with extensions 20, extending perpendicularly therefrom. The extensions are dimensioned so that they may be received within gap 12 defined between semicircular supports 9. The extensions 20 are provided with aligned passageways 21 extending therethrough. Passageways 21 of extensions 20 are disposed so that they may be aligned with holes 13 of semi-circular supports 9 when the extensions are placed within gap 12.

During assembly, sleeve extensions 20 are matingly received within gap 12 of semi-circular supports 9 so that holes 13 and passageways 21 are aligned. Then, a pivot screw 14 is disposed through hole 13 of the first support 9, and through passageways 21, and through hole 13 in the second support, 9.

If desired, the cylindrical surface of the second support may be provided with a welded nut, so that the tip of the screw fits within welded nut 33. Screw 14 acts as a pivot support and enables the sleeve and rotatable, cylindrical housing 15 to rotatably pivot with respect to pedestal 3 about an axis perpendicular to the longitudinal axis of pedestal 3.

To enable assembly to be fixed at a desired angular position about that axis, a pair of set screws are provided, and are received within holes 22 of semi-circular supports 9. When the desired position is achieved, the set screws are tightened in a conventional manner so that the ends thereof press against surfaces of sleeve extensions 20. Consequently, instrument 15 is fixed in position with respect to pedestal 3 in a second axial direction.

Figure 5:
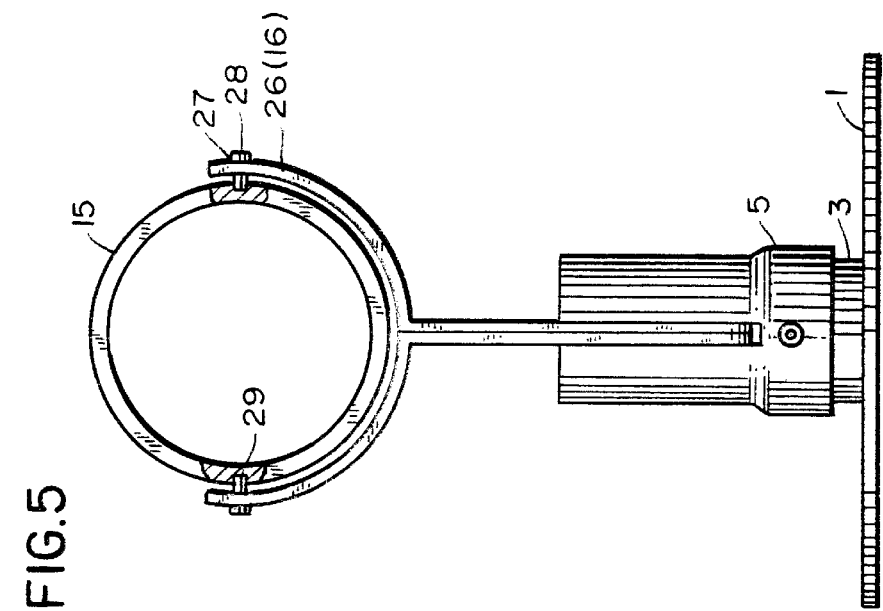
FIG. 5 is a cross-sectional view of another embodiment of the instrument assembly of the present invention, illustrating a partial annular sleeve.

Referring now to FIGS. 2 and 5, the mechanism for enabling the instrument in cylindrical instrument housing 15 to rotate with about the axis of the cylindrical housing will now be described. In the simplest construction, the annular sleeve is dimensioned to tightly grasp the cylindrical housing once the extensions are parallelized for insertion into the gap. Alternatively, another set of paired openings in the extensions may be made adjacent the annular sleeve, and tightening means, such as a screw and nut, 18, used to tighten the grip of the annular sleeve on the cylindrical housing. In another embodiment, the cylindrical instrument housing may be provided with an annular groove 29, and the annular sleeve with openings for set screws 28 which ride in the groove to permit rotation of the cylinder with respect to the annular sleeve, and which may be tightened against the circumferential surface of the groove, fixing the position in a third axial direction.

Although instrument 15 will remain securely in position, it is required that the position of instrument 15 be adjusted. Therefore, depending on the axial rotation required, either the set screws 8 of cap 5, and/or the set screws for the annular sleeve, and/or the set screws for holes 22 of semi-circular supports 9, are loosened. This enables the pivotal rotation of instrument 15 in the direction desired. Once the desired new position is achieved, the set screws which have been loosened are re-tightened, as described above, and assembly 11 is again ready for use.

Figure 4:
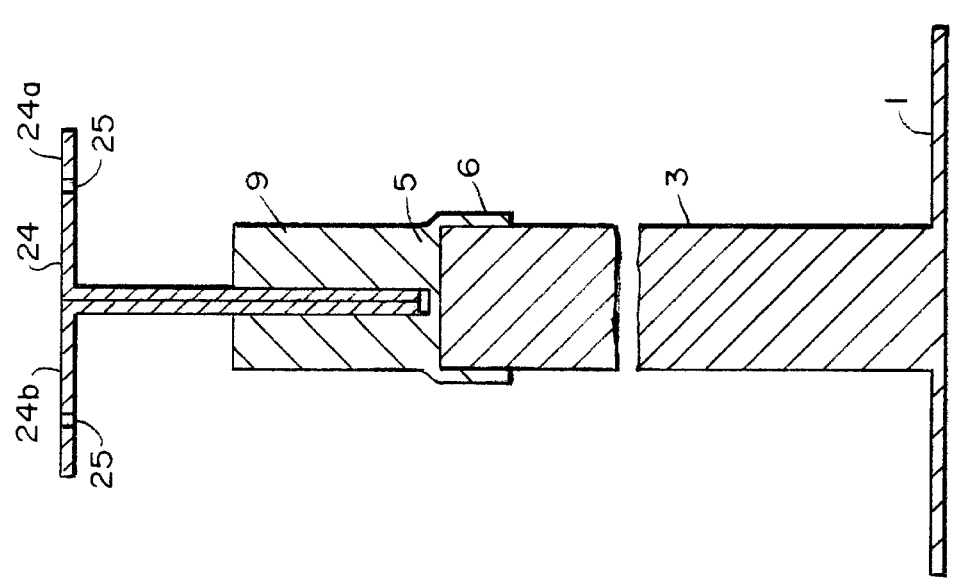
FIG. 4 is a cross-sectional view of another embodiment of the instrument assembly of the present invention, wherein the annular sleeve has been replaced by a split-plane surface for attaching the instrument.

A particular type of set screw, illustrated in FIG. 4 of U.S. Pat. No. 4,991,815, incorporated herein in its entirety, is well suited for use in the present inventive assembly.

FIG. 4 illustrates another embodiment of the present invention, wherein the annular sleeve is replaced with a split-plane plate, 24a and 24b, with extensions 20 dimensioned to be received into gap, 12. The split-plane plate is provided with means, such as openings 25 for attaching the instrument to the split-plane plate.

FIG. 5 illustrates another embodiment of the present invention, having only a partial annular sleeve 26. As shown in FIG. 5, the rotatable cylindrical housing 15 is secured within the sleeve by screws 28 which extend through holes 27 adjacent the opening in the partial sleeve, and which may be tightened against the housing. Preferably, the housing has an annular groove 29, and screws 28 move within the groove 29, and may be tightened against the inner circumferential surface of the groove, to fix the position of the cylinder in relation to the sleeve.

The instrument assembly of the invention is preferably made of stainless steel. As a result, the assembly is dent and scratch resistant. Additionally, the assembly will not corrode or discolor and may be easily cleaned of graffiti, adhesive posters and the like.

Since the position of the instrument is fixed after adjustment by tightening appropriately the various set screws, the instrument's position cannot be disturbed by vandals or potential terrorists. This is because the set screw may only be loosened by utilizing a specially designed hex wrench. Consequently, a substantially tamper-resistant assembly is achieved.

In addition, the assembly of the invention may also be used in large warehouses, so that interior vehicles, while transporting merchandise from one area to another, can tell whether or not an approaching second vehicle will reach a common intersection. Further, the instrument assembly is suitable for passenger elevators, so that a passenger can tell whether or not an attacker or robber hiding in the inside of the elevator is present. Moreover, the instrument assembly is suitable for use in other waiting areas where expanded viewing is required, as well as for all sensitive or strategic areas.

There are many additional uses for instruments which can be permanently mounted in a public place and secure from vandalism, namely infrared, laser or visible light transmitter system for e.g. security of museums, or banks, after closing; microwave antennas for communications systems; satellite uplink or receptor dishes; radar; photoelectric cells, antennas and search lights.

There has thus been shown and described a novel instrument assembly which fulfills all the objects and advantages sought therefor. Many changes, modifications, variations and other uses and applications of the subject invention will, however, become apparent to security professionals considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An instrument assembly comprising:
    an instrument which transmits or receives electromagnetic radiation, said instrument being contained within a cylindrical housing rotatably mounted within an annular sleeve,
    means for supporting said instrument,
    means for connecting the instrument to the support means so as to permit adjusting the position of the instrument in relation to the support means,
    means for enabling rotation of said instrument about a first axis, comprising a cap member rotatably mounted on said support means; and
    a pair of support elements attached to the cap, and forming a rectangular gap therebetween,
    a sleeve extension, perpendicular to the annular sleeve, and dimensioned to be received in the gap, means for connecting the annular sleeve to the pair of support elements, comprising aligned holes in the sleeve extension and in the supports; and a pivot screw extending through the holes of said extension and support elements for enabling rotatable pivoting of said extension with respect to said support elements; enabling rotation of said extension about an axis perpendicular to the first axis;

means for preventing the sleeve extension from rotatably pivoting with respect to the support element comprising at least one set screw extending through the support elements and adapted to be tightened against said sleeve extension; and means for preventing the cylindrical housing from rotating within the annular sleeve.

2. The instrument assembly of claim 1, wherein said supporting means comprises a base and a pedestal mounted on said base.

3. The instrument assembly of claim 2, wherein the means for preventing the cylindrical housing from rotating within the annular sleeve comprises a pair of sleeve extension which when parallelized for placement in the gap cause the sleeve to grasp the cylindrical housing.

4. The instrument assembly of claim 2, wherein the means for preventing the cylindrical housing from rotating within the annular sleeve comprises a pair of sleeve extensions with holes adjacent the sleeve, and tightening means to secure the extensions together which causes the sleeve to grasp the cylindrical housing.

5. The instrument assembly of claim 2, wherein the means for preventing the cylindrical housing from rotating within the annular sleeve comprises an annular groove in the housing and at least one set screw extending through a hole in the sleeve, which screw may be tightened against the cylindrical housing.

6. The assembly of claim 2, wherein said cap member is rotatably mounted on said pedestal.

7. The assembly of claim 2, wherein said cap member comprises a substantially plainer top and an annular sleeve extending from said top to cover at least a portion of said supporting means.

8. The assembly of claim 7, further including means for preventing said cap member from rotating about said supporting means.

9. The assembly of claim 8, wherein said rotating preventing means comprises means for pressing against said supporting means.

10. The assembly of claim 9, wherein said pressing means comprises at least one set screw extending through said sleeve of said cap member and adapted to be tightened against said pedestal.

11. The assembly of claim 10, wherein said supporting means includes an annular groove for receiving said at least one set screw when tightened against said supporting means.

12. The assembly of claim 11, wherein said head of said at least one set screw is selectively engageable with a pre-designed tool element.

13. The assembly of said claim 2, wherein said support means have a semi-circular cross-section.

14. An instrument assembly comprising:

an instrument which transmits or receives electromagnetic radiation, said instrument being contained within a cylindrical housing rotatably mounted within an annular sleeve, means for supporting said instrument, means for connecting the instrument to the support means so as to permit adjusting the position of the instrument in relation to the support means, about three directional axes, said means for connecting comprising:

means for enabling rotation of said instrument about a first axis, comprising a cap member rotatably mounted on said support means; together with means for preventing the cap member from rotating with respect to the pedestal, comprising at least one set extending through the cap member and adapted to be tightened against said pedestal; and a pair of support elements attached to the cap, and forming a rectangular gap therebetween, a sleeve extension, perpendicular to the annular sleeve, and dimensioned to be received in the gap, means for connecting the annular sleeve to the pair of support elements, comprising aligned holes in the sleeve extension and in the supports; and a pivot screw extending through the holes of said extension and support elements for enabling rotatable pivoting of said extension with respect to said support elements; enabling rotation of said extension about an axis perpendicular to the first axis;

means for preventing the sleeve extension from rotatably pivoting with respect to the support element comprising at least one set screw extending through the support elements and adapted to be tightened against said sleeve extension; and means for preventing the cylindrical housing from rotating within the annular sleeve.

15. The instrument assembly of claim 14, wherein said support means comprises a base and a pedestal mounted on said base.

16. The instrument assembly of claim 14, wherein the means for preventing the cylindrical housing from rotating within the annular sleeve comprises a pair of sleeve extension which when parallelized for placement in the gap cause the sleeve to grasp the cylindrical housing.

17. The instrument assembly of claim 14, wherein the means for preventing the cylindrical housing from rotating within the annular sleeve comprises a pair of sleeve extensions with holes adjacent the sleeve, and tightening means to secure the extensions together which causes the sleeve to grasp the cylindrical housing.

18. The instrument assembly of claim 14, wherein the means for preventing the cylindrical housing from rotating within the annular sleeve comprises an annular groove in the housing and at least one set screw extending through a hole in the sleeve.

19. An instrument assembly comprising:

an instrument which transmits or receives electromagnetic radiation, said instrument being contained within a cylindrical housing rotatably mounted in an annular sleeve, a base for mounting the instrument, a cylindrical pedestal attached to said base, and means for connecting the instrument in the cylindrical housing to the mounting base so as to permit adjusting the position of the instrument in relation to the base, about three directional axes, said means for connecting comprising:

means for enabling rotation of said instrument about a first axis, comprising a cap member rotatably mounted on said base, together with means for preventing the cap member from rotating with respect to the pedestal, comprising at least one set extending through the cap member and adapted to be tightened against said pedestal; and a pair of support elements attached to the cap, and forming a rectangular gap therebetween, a sleeve extension, perpendicular to the annular sleeve, and dimensioned to be received in the gap, means for connecting the annular sleeve to the pair of support elements, comprising aligned holes in the sleeve extension and in the supports; and a pivot screw extending through the holes of said extension and support elements for enabling rotatable pivoting of said extension with respect to said support elements; enabling rotation of said extension about an axis perpendicular to the first axis;

means for preventing the sleeve extension from rotatably pivoting with respect to the support element comprising at least one set extending through the support elements and adapted to be tightened against said sleeve extension; and means for preventing the cylindrical housing from rotating within the annular sleeve.

20. An instrument assembly comprising:

an instrument which transmits or receives electromagnetic radiation, said instrument being contained within a cylindrical housing rotatably mounted in an annular sleeve, a base for mounting the instrument, a cylindrical pedestal attached to said base, and means for connecting the instrument in the cylindrical housing to the mounting base so as to permit adjusting the position of the instrument in relation to the base, about three directional axes, said means for connecting comprising:

means for enabling rotation of said instrument about a first axis, comprising a cap member rotatably mounted on said base, together with means for preventing the cap member from rotating with respect to the pedestal, comprising at least one set extending through the cap member and adapted to be tightened against said pedestal; and a pair of support elements attached to the cap, and forming a rectangular gap therebetween, a sleeve extension, perpendicular to the annular sleeve, and dimensioned to be received in the gap, means for connecting the annular sleeve to the pair of support elements, comprising aligned holes in the sleeve extension and in the supports; and a pivot screw extending through the holes of said extension and support elements for enabling rotatable pivoting of said extension with respect to said support elements; enabling rotation of said extension about an axis perpendicular to the first axis;

means for preventing the sleeve extension from rotatably pivoting with respect to the support element comprising at least one set extending through the support elements and adapted to be tightened against said sleeve extension; and means for preventing the cylindrical housing from rotating within the annular sleeve;

wherein each of said at least one set screws may only be loosened by a tool element pre-designed for selective mating engagement with said set screws, each of said set screws comprising a head comprising a hexagonal rim and a projecting pin for defining an annular opening therebetween, said tool element having an opening for matingly receiving the pin of said head of said set screws.

* * * * *